(12) United States Patent
Becher et al.

(10) Patent No.: US 11,367,148 B2
(45) Date of Patent: Jun. 21, 2022

(54) DISTRIBUTED LEDGER BASED MASS BALANCING VIA SECRET SHARING

(71) Applicant: SAP SE, Walldorf (DE)

(72) Inventors: Kilian Becher, Dresden (DE); Axel Schroepfer, Borthen (DE); Mirko Schaefer, Dresden (DE)

(73) Assignee: SAP SE, Walldorf (DE)

(*) Notice: Subject to any disclaimer, the term of this patent is extended or adjusted under 35 U.S.C. 154(b) by 112 days.

(21) Appl. No.: 16/850,432

(22) Filed: Apr. 16, 2020

(65) Prior Publication Data

US 2021/0327002 A1    Oct. 21, 2021

(51) Int. Cl.
*G06Q 30/06* (2012.01)
*G06Q 40/00* (2012.01)
(Continued)

(52) U.S. Cl.
CPC ....... *G06Q 40/125* (2013.12); *G06Q 30/0185* (2013.01); *G06Q 30/0605* (2013.01); *H04L 9/0637* (2013.01); *H04L 9/0825* (2013.01)

(58) Field of Classification Search
CPC ............ G06Q 40/125; G06Q 30/0185; G06Q 30/0605
See application file for complete search history.

(56) References Cited

U.S. PATENT DOCUMENTS

2018/0137512 A1* 5/2018 Georgiadis ............ H04L 9/3239
2020/0259828 A1* 8/2020 Shaffer ............... H04L 63/0853

FOREIGN PATENT DOCUMENTS

EP    1656600 B1 *  6/2017  ............ G06Q 20/10

* cited by examiner

*Primary Examiner* — Rokib Masud
(74) *Attorney, Agent, or Firm* — Buckley, Maschoff & Talwalkar LLC

(57) ABSTRACT

A producer may supply amounts $x_i$ of a good to a plurality of consumers $C_i$ in a series of transactions and be subject to a mass balancing verification protocol after every K transactions. A producer platform may compute K random shares ($r_1$ through $r_K$) of a random value r, publish blinded amounts $t_i$ representing $x_i+r_i$ to a secure, distributed transaction ledger, and transmit an encrypted $r_i$ to consumer $C_i$ using an asymmetric cryptosystem. A consumer platform may receive and decrypt $r_i$ (while the consumer Ci actually receives an amount $\hat{x}_i$ of the good from the producer), compute $\hat{x}_i+r_i$ and generate a fraud alert signal if it differs from the published $t_i$. The consumer platform may also transmit an encrypted rolling sum value to a next consumer $C_{i+1}$. A verifier platform may, after K transactions, execute the mass balance verification protocol to determine a total amount of the good that the producer had collectively supplied to the consumers $C_i$. The verifier platform may also generate a fraud alert signal when appropriate based on the total amount and a maximum allowed amount.

21 Claims, 10 Drawing Sheets

(51) Int. Cl.
*H04L 9/06* (2006.01)
*H04L 9/08* (2006.01)
*G06Q 30/00* (2012.01)

*PRIOR ART*

DISTRIBUTED LEDGER BASED MASS BALANCING VIA SECRET SHARING

BACKGROUND

Distributed ledgers, such as blockchains, are transparent and ensure integrity by design. Any party who has access to the distributed ledger can read the data it contains. Distributed ledgers are particularly useful in scenarios where multiple institutions want to keep consensus and provide public verifiability of some statement. One such scenario is "mass balancing." In mass balancing, a producer of some product or service is entitled to produce a quota (e.g., by a governmental or a non-governmental organization). This quota represents a maximum value that is publicly known (e.g., one million barrels or $2,000,000 worth of a product). To ensure that the producer does not exceed this production-output limit, information about produced and/or sold amounts can be stored on a distributed ledger. This provides public verifiability. Everyone who has access to the distributed ledger (e.g., consumers, governmental authorities or non-governmental organizations) can read each of the produced amounts, sum them up, and compare the resulting amount to the producer's overall quota.

While this approach ensures transparency and enables verifiability, it may be associated with some disadvantages. For example, such a technique may reveal details about a final product such as, depending on the industry, a recipe (e.g., single ingredients or amounts of medicine in pharmaceutical industry). That is, this form of publicly verifiable mass balancing does not preserve any privacy and could adversely impact a producer's competitive advantage. Furthermore, this type of non-privacy-preserving storage of customer data in a distributed ledger might conflict with legal regulations, such as the General Data Protection Regulations ("GDPR") of the European Union.

It would therefore be desirable to provide an improved mass balancing protocol in an automatic and efficient manner.

SUMMARY

According to some embodiments, methods and systems may be associated with a producer who supplies amounts $x_i$ of a good to a plurality of consumers $C_i$ in a series of transactions and is subject to a mass balancing verification protocol after every K transactions. A producer platform may compute K random shares ($r_1$ through $r_K$) of a random value r, publish blinded amounts $t_i$ representing $x_i + r_i$ to a secure, distributed transaction ledger, and transmit an encrypted $r_i$ to consumer $C_i$ using an asymmetric cryptosystem. A consumer platform may receive and decrypt $r_i$ directly from the producer platform as well as an amount $\hat{x}_i$ of the good in the physical world. The consumer platform may compute $\hat{x}_i + r_i$ and generate a fraud alert signal if it differs from the blinded amount $t_i$ of the good that was published to the secure, distributed transaction ledger by the producer platform. The consumer platform may also transmit an encrypted rolling sum value to a next consumer $C_{i+1}$. A verifier platform may, after K transactions, execute the mass balance verification protocol to determine a total amount of the good that the producer had collectively supplied to the consumers $C_i$. The verifier platform may also generate a fraud alert signal when appropriate based on the total amount and a maximum allowed amount.

Some embodiments comprise: means for computing K random shares ($r_1$ through $r_K$) of a random value r; means for publishing blinded amounts $t_i$ representing $x_i + r_i$ to a secure, distributed transaction ledger using additive secret sharing to store information associated with amounts $x_i$ in a privacy-preserving form; means for transmitting an encrypted $r_i$ to consumer $C_i$ using an asymmetric cryptosystem; means for receiving, at a consumer platform of consumer $C_i$, the encrypted $r_i$ from the producer platform while the consumer $C_i$ actually receives an amount $\hat{x}_i$ of the good from the producer; means for executing, by the consumer platform, a decryption algorithm to determine $r_i$; means for computing $\hat{x}_i + r_i$ and generating, by the consumer platform, a fraud alert signal if it differs from the published $t_i$; means for transmitting an encrypted rolling sum value to a next consumer $C_{i+1}$; means for executing, by a verifier platform after K transactions, the mass balance verification protocol to determine a total amount of good that the producer had collectively supplied to the consumers $C_i$; and means for generating, by the verifier platform, a fraud alert signal when appropriate based on the total amount and a maximum allowed amount.

Some technical advantages of some embodiments disclosed herein are improved systems and methods to provide an improved mass balancing protocol in an automatic and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
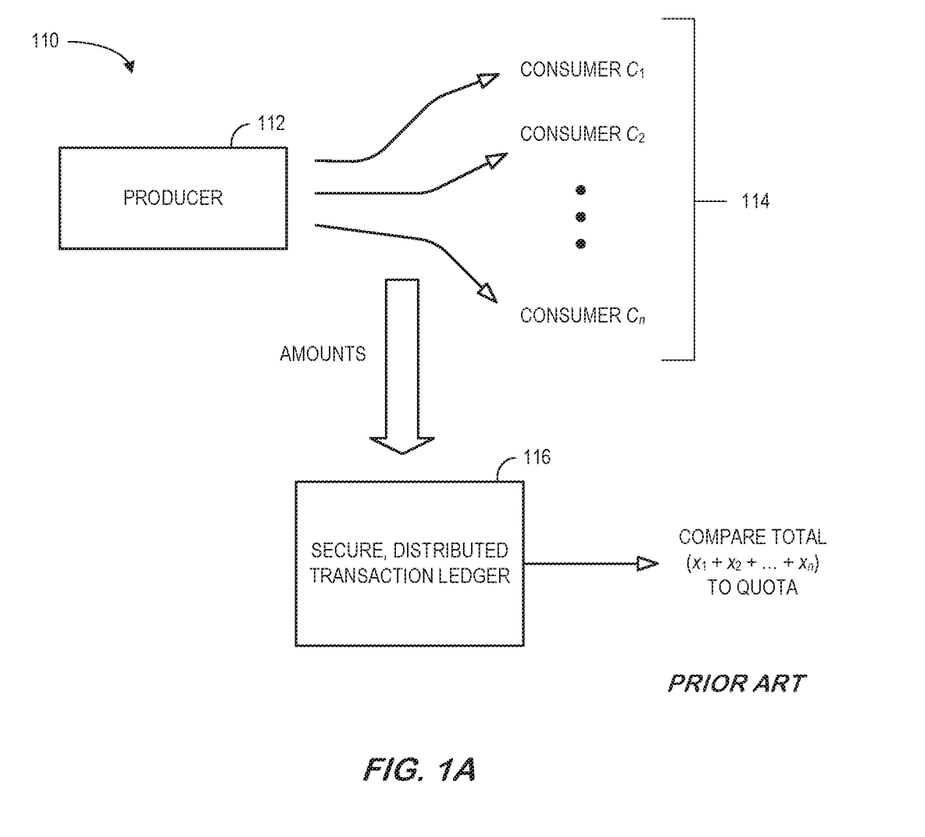
FIG. 1A is a system incorporating one approach to mass balancing.

FIG. 1A is a system 110 incorporating one approach to mass balancing. In particular, a producer 112 provides various amounts of product $x_i$ to consumers 114 $C_1$ through $C_n$. Moreover, the producer 112 is assigned an overall limit or quota associated with the total amount of product that is provided. For example, the producer 112 might be an oil refinery that is only allowed to ship 10,000 barrels of oil in a particular month. In this case, the producer 112 and/or consumers 114 might record amounts of product that are provided in a secure, distributed transaction ledger 116 (e.g., $C_2$ might indicate that it received 3,000 barrels, $C_3$ might record that it received 1,000 barrels, etc.). It would then be relatively simple process for the system 110 to calculate the total amount of product that was sold by the producer 112 in any given month (e.g., $x_1+x_2+\ldots+x_n$). Note, however, that this approach also discloses exactly how much each consumer 114 received. In some cases, parties might prefer to keep this level of detail private. For example, a company might be required disclose the overall amount it pays the board of directors without disclosing exactly how much each director earns individually.

Some embodiments described herein provide a mechanism that allows for public verifiability in mass balancing scenarios and ensures privacy of the producer's production details such as amounts. The mechanism may be based on an information security technology referred to as "additive secret sharing." As a result, a system may store single data points, e.g., amounts, on a distributed ledger in a way that preserves privacy. The data held by the distributed ledger might not reveal anything about the single amounts but still allows for public verifiability of an overall sum of produced amounts. This, in turn, may enable comparison to a producer's quota.

Some embodiments disclosed herein may utilize an asymmetric cryptosystem. As used herein, the phrase "asymmetric cryptosystem" (also known as "public-key cryptography") may refer to a cryptographic system that uses pairs of keys, including: (1) public keys, which may be disseminated widely; and (2) private keys, which are known only to the owner. The generation of such keys may depend on cryptographic algorithms (e.g., based on mathematical problems) to produce one-way functions. Effective security then only requires keeping the private key private, and the public key can be openly distributed without compromising security. In such a system, any person can encrypt a message using the receiver's public key, but that encrypted message can only be decrypted with the receiver's private key. In some cases, authentication may also be provided. For example, a sender may combine a message with a private key to create a short digital signature associated with the message. Anyone with the sender's corresponding public key can then combine the same message and a potential digital signature associated with it to determine if the signature is valid (i.e., made by the owner of the corresponding private key).

An asymmetric cryptosystem may be associated with a tuple $\mathcal{C}S=(G, E, D)$ consisting of three polynomial-time algorithms:

A probabilistic key-generation algorithm G that takes a security parameter k as an input and outputs a key pair (pk, sk) consisting of a public encryption key pk and a secret decryption key sk.

A (potentially probabilistic) encryption algorithm E that takes a plaintext $x \in \mathcal{M}$ and pk as inputs and outputs the ciphertext $y=E(x, pk) \in \mathcal{C}$. $\mathcal{M}$ and $\mathcal{C}$ denote the plaintext and ciphertext space, respectively.

A decryption algorithm D that takes a ciphertext $y \in \mathcal{C}$ and sk as inputs and outputs the plaintext $x=D(y, sk) \in \mathcal{M}$. For simplification, the encryption of $x \in \mathcal{M}_i$ under a cryptosystem $\mathcal{C}S_i=(G_i, E_i, D_i)$ for $pk_i$ may be denoted by $y=E_{pk_i}(x)$. Similarly, the decryption of $y \in \mathcal{C}_i$ for $sk_i$ may be denoted by $x=D_{sk_i}(y)$.

Figure 1B:
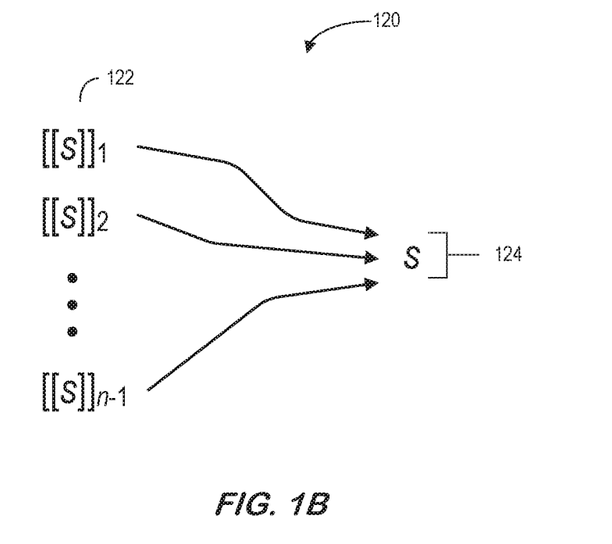
FIG. 1B illustrates a secret sharing system.

Some embodiments described herein may utilize additive secret sharing. As used herein, the phrase "additive secret sharing" may refer to a party that wants to split a secret into several shares given to shareholders, in such a way that each individual shareholder does not know the secret, yet if enough shareholders re-combine their shares then the secret can be reconstructed. FIG. 1B illustrates a secret sharing system 120. The system 120 lets a party split some secret information s 124 $\in GF(q)$ in n parts such that these n parts together represent s 124. We denote a secret-shared value s by $[\![s]\!]$ 122 while the i-th part, called share, is denoted by $[\![s]\!]_i$ 122. Note that the additive secret sharing system 120 ensures privacy and correctness. Privacy guarantees that no share leaks any non-trivial information about s 124 while correctness ensures that s 124 can be reconstructed by combining the n shares. To share a value s 124, one chooses n-1 random shares $[\![s]\!]_1, \ldots, [\![s]\!]_{n-1}$ uniformly at random. The n-th share is computed as follows:

$$[\![s]\!]_n = s - \sum_{i=1}^{n-1} [\![s]\!]_i$$

Some embodiments described herein may utilize one or more secure, distributed transaction ledgers. As used herein, the phrase "distributed ledger" (also called a shared ledger or distributed ledger technology) may refer to a consensus of replicated, shared, and synchronized digital data that might be geographically spread across multiple sites, countries, or institutions without incorporating a central administrator or centralized data storage. A peer-to-peer network and consensus algorithms may help ensure accurate replication. For example, a distributed ledger database might be spread across several nodes (e.g., devices) on a peer-to-peer network, and each node may replicate and save an identical copy of the ledger (updating itself independently). When a ledger update happens, each node may construct the new transaction and the nodes may vote by consensus algorithm on which copy is correct. Once a consensus has been determined, all of the nodes update themselves with the new, correct copy of the ledger. Security may be accomplished through cryptographic keys and signatures. As long as most of the nodes are honest, such a secure, distributed ledger will ensure data integrity. One very common form of distributed ledger is blockchain technology (e.g., associated with a public or private blockchain).

Figure 2:
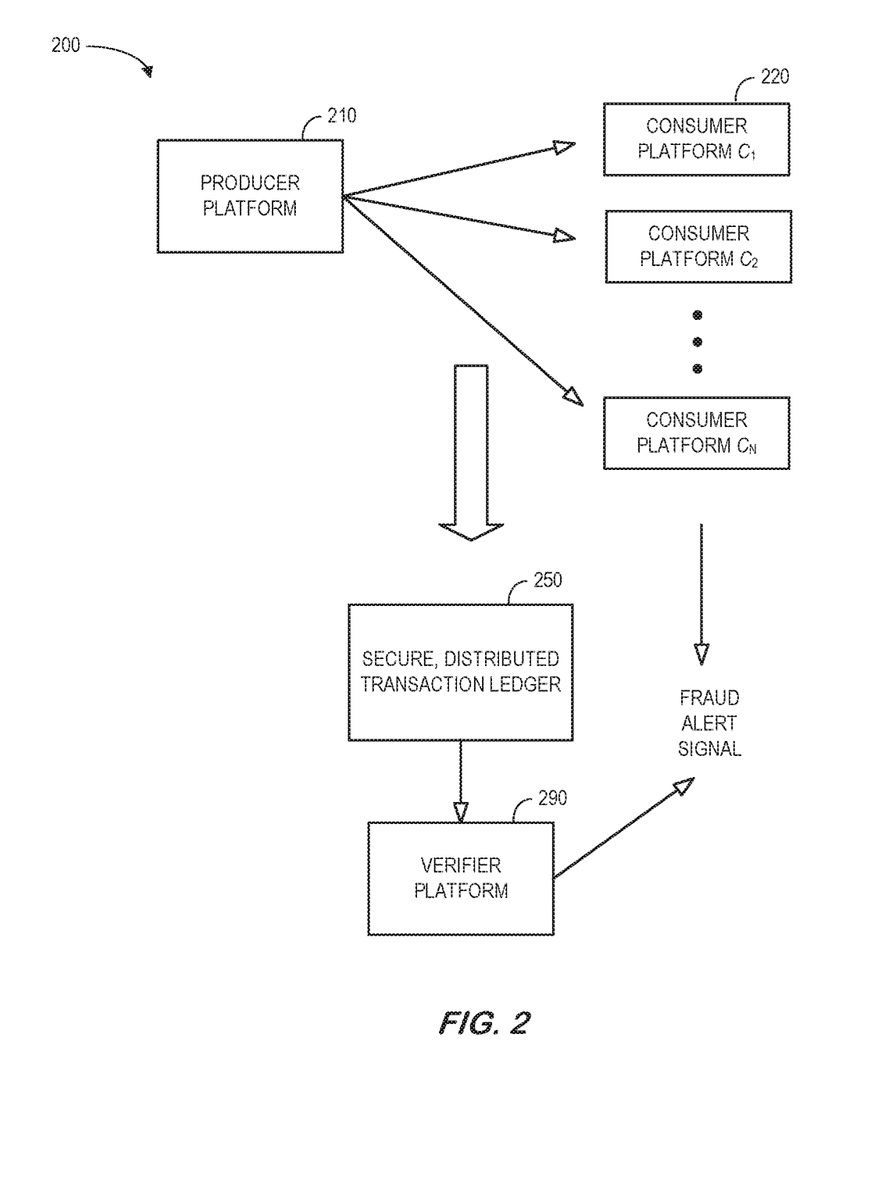
FIG. 2 is a high-level block diagram of a system in accordance with some embodiments.

FIG. 2 is a high-level block diagram of a system 200 in accordance with some embodiments. The system 200 includes a producer platform 210 that supplies an amount of good to consumers associated with consumer platforms 220 $C_1$ through $C_n$ in a series of transactions. Moreover, information about the transactions is recorded in a secure, distributed transaction ledger 250. The consumer platforms 220 might generate a fraud alert signal (e.g., when they suspect that the producer platform 210 is not being honest about an amount of good that was provided). Similar, a verifier platform 290 might analyze information in the distributed transaction ledger 250 and generate a fraud alert signal (e.g., when the producer platform 210 exceeds a production quota). According to some embodiments, portions of the system 200 might operate automatically or be initiated via a command from a remote operator or administrator interface device. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The producer platform 210 and/or the other devices in the system 200 may store information into and/or retrieve information from various data stores (e.g., data storage devices), which may be locally stored or reside remote from the producer platform 210 and/or the other devices. Although a single producer platform 210 and verifier platform 290 are shown in FIG. 2, any number of such devices may be included. Moreover, various devices described herein might be combined according to embodiments of the present invention. For example, in some embodiments, the secure, distributed transaction ledger 250 and verifier platform 290 might comprise a single apparatus. Some or all of the system 200 functions may be performed by a constellation of networked apparatuses, such as in a distributed processing or cloud-based architecture.

A user or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to configure quota rules or requirements, add consumers, etc.) and/or provide or receive automatically generated recommendations or results from the system 200.

Figure 3A:
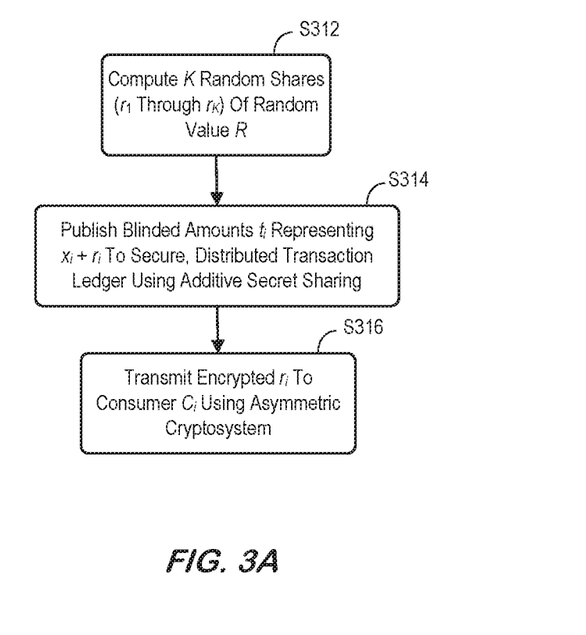
FIG. 3A is a producer platform method according to some embodiments.

FIG. 3A is a method that might be performed by the producer platform 210 in the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 3B:
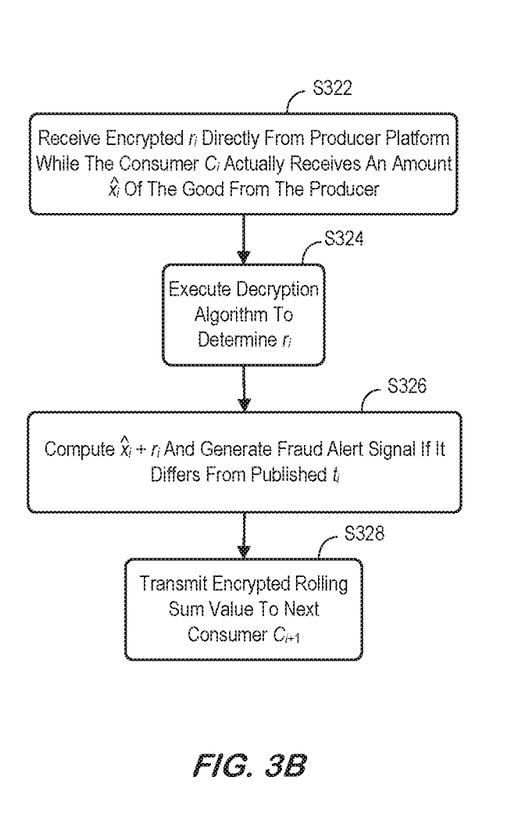
FIG. 3B is a consumer platform method in accordance with some embodiments.
Figure 3C:
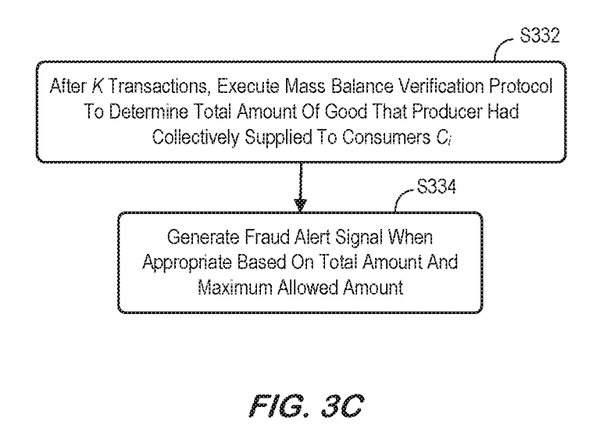
FIG. 3C is a verifier platform method according to some embodiments.

The methods of FIGS. 3A through 3C might be associated with, for example, a verification process that is to be performed after every K transactions have been executed and recorded (e.g., after five product shipments to various consumers). At S312, a computer processor of a producer platform may compute K random shares ($r_1$ through $r_K$) of a random value r. At S314, the producer platform may then publish blinded amounts $t_i$ representing $x_i + r_i$ to a secure, distributed transaction ledger (e.g., implemented with blockchain technology) using additive secret sharing to store information associated with amounts $x_i$ in a privacy-preserving form. That is, looking at the stored value will not reveal $x_i$ unless information about the random share $r_i$ is also known. At S316, the producer platform may transmit an encrypted $r_i$ to consumer $C_i$ using an asymmetric cryptosystem.

The information transmitted at S316 may then be evaluated by the consumer $C_i$. For example, FIG. 3B is a method that might be performed by the consumer platforms 220 in the system 200 described with respect to FIG. 2. At S322, a consumer platform of consumer $C_i$ may receive the encrypted $r_i$ from the producer platform while the consumer Ci actually receives an amount $\hat{x}_i$ of the good from the producer. The consumer platform may then execute a decryption algorithm to determine $r_i$ at S324. At S326, the consumer platform may then calculate $\hat{x}_i + r_i$ and generate a fraud alert signal if $\hat{x}_i + r_i$ differs from the published $t_i$. For example, if the producer platform delivered 5,000 gallons of product to the consumer platform but published a blinded value of $t_i = \hat{x}_i + r_i$ to the secure, distributed transaction ledger indicating that only 2,500 gallons were delivered, the consumer platform might at S326 generate a fraud alert signal to a governmental authority. As will be explained, the consumer platform may also transmit an encrypted rolling sum value to a next consumer $C_{i+1}$ at S328.

FIG. 3C is a method that might be performed by the verifier platform 290 in the system 200 described with respect to FIG. 2. At S332, a verifier platform, after K transactions, may execute a mass balance verification protocol to determine a total amount of good that the producer had collectively supplied to the consumers $C_i$. At S334, the verifier platform may generate a fraud alert signal when appropriate based on the total amount and a maximum allowed amount. For example, if a producer was authorized to sell 100 jet engines in a single year, the verifier platform might generate a fraud alert signal when it determined that the producer has delivered 110 jet engines so far this year.

For simplification purposes, assume that a single producer P transfers amounts $x_i$ of a particular good to consumers $C_i$. These amounts are published via a distributed ledger DL in a privacy-preserving form. Each of these entries can be verified by the respective consumer $C_i$. This may be referred to as "single amount verification." Furthermore, the producer P tries to convince verifier V that the total amount $x = \Sigma_i x_i$ does not exceed a maximum $x_{max}$ (e.g., a threshold quota). This maximum amount $x_{max}$ of a good that producer P is entitled to produce is public information. This verification may be referred to as "balance verification."

Also assume that every consumer $C_i$ has an individual key pair ($pk_i$, $sk_i$) of an asymmetric cryptosystem, consisting of a public encryption key $pk_i$ and a secret decryption key $sk_i$. Applying the encryption function $E_{pk_i}(\bullet)$ to a plaintext x yields the corresponding ciphertext y, i.e., $E_{pk_i}(x) = y$. Accordingly, applying the decryption function $D_{sk_i}(\bullet)$ to a ciphertext y yields the corresponding plaintext x, i.e., $D_{sk_i}(y) = x$.

Further assume a balance verification frequency of once every K produced amounts. At the beginning of each K-cycle, P secret-shares a random value r by computing K random shares such that $r_1 = [\![r]\!]_1, \ldots, r_K = [\![r]\!]_K$ of r such that $r = \Sigma_{i=1}^{K} r_i$.

The protocol specification includes an amount publication that begins with the producer P blinding the amount $x_i$ by adding the i-th random share $r_i$. Producer P then publishes the resulting blinded value $t_i$ via the distributed ledger DL as follows:

$$P \rightarrow DL : t_i = x_i + r_i$$

The amount publication then has producer P encrypt $r_i$ with consumer $C_i$'s public key and send the resulting ciphertext $s_i$ to consumer $C_i$ as follows:

$$P \rightarrow C_i : s_i = E_{pk_i}(r_i)$$

Next, the protocol specification performs single amount verification. Initially, consumer $C_i$ decrypts $s_i$ and obtains the random blinding share $r_i$ used for blinding as follows:

$$C_i : r_i = D_{sk_i}(s)$$

Next in the single amount verification, consumer $C_i$ adds the decrypted $r_i$ to the (physically) received amount $\hat{x}_i$ and verifies $t_i$ by comparing it to this sum. If the two values are not equal, consumer $C_i$ reports fraud as follows:

$$C_i : t_i \stackrel{?}{=} \hat{x}_i + r_i$$

a) if $t_i \neq \hat{x}_i + r_i$: report fraud (producer dishonest)

Finally, the single amount verification performs the following to allow for removing the overall blinding $r = \Sigma_i\, r_i$ later during balance verification, the consumers maintain the sum $r_\Sigma$ of the used $r_i$. To do so, each consumer $C_i$ sends $r_\Sigma$ to the consumer $C_{i+1}$ of the next transaction. To prevent consumer $C_2$ from learning $r_1$, consumer $C_1$ blinds $r_1$ with a randomly chosen $r_0$. The sum $r_\Sigma$ is transferred in an encrypted form from consumer $C_i$ to consumer $C_{i+1}$ to prevent uninvolved participants from inferring $r_i$ by comparing two consecutive $r_\Sigma$ as follows:

$$C_i \rightarrow C_{i+1}:$$

a) If i=1: $E_{pk_{i+1}}(r_\Sigma) = E_{pk_{i+1}}(r_0 + r_1)$ with $r_0 \in \mathcal{M}_i$
b) If 1<i<K: $E_{pk_{i+1}}(r_\Sigma) = E_{pk_{i+1}}(D_{sk_i}(r_\Sigma) + r_i)$
c) If i=K: $E_{pk_1}(r_\Sigma) = E_{pk_1}(D_{sk_i}(r_\Sigma) + r_i)$ Next, the protocol specification performs balance verification. Initially the balance verification, after K produced amounts (i.e., at the end of a K-cycle or "epoch"), consumer $C_1$ subtracts $r_0$ from the blinded sum $r_\Sigma$ of random values $r_i$ to obtain the unblinded sum. The unblinded sum of the j-th K-cycle is denoted by $r_{\Sigma_j}$. Consumer $C_1$ publishes the unblinded sum $r_{\Sigma_j}$ via distributed ledger DL as follows:

$$C_1 \rightarrow DL: \text{ if } i = K : r_{\Sigma_j} = D_{sk_1}(r_\Sigma) - r_0$$

Balance verification then involves, once every K produced amounts (i.e., once i=K), verifier V computes the balance by adding all $t_i$ and subtracting their sum from the maximum amount $x_{max}$. The random shares $r_i$ (used in each $t_i = x_i + r_i$) of each K-cycle add up to $r_\Sigma = r$. Therefore, the $r_{\Sigma_1}, \ldots, r_{\Sigma_j}$ of the completed K-cycles need to be added for the blindings to cancel out. The result is the balance $\delta_j$ of the j-th K-cycle as follows:

$$V: \delta_j = x_{max} - \Sigma_i t_i + \Sigma_j r_{\Sigma_j}$$

a) If $\delta_j < 0$: report fraud (mass balance exceeded)
b) If $\delta_j = 0$: report fraud once P publishes another $t_i$ For recurring balance verification, a verifier V might speed up the calculation of $\delta_j$ by caching the balance after every K-cycle (either locally by each verifier V or on distributed ledger DL) and thus achieve a number of additions that is independent of the number of previous K-cycles. To do so, when computing $\delta_j$ the verifier V may subtract the $t_i$ of the current K-cycle from the previous balance $\delta_{j-1}$ and add $r_{\Sigma_j}$ of the current round.

Furthermore, according to some embodiments producer P could secret-share r=0 instead of some random r. This may simplify the balance computation because the random $r_i$ of a K-cycle will cancel out automatically (assuming that the producer P always behaves in an honest fashion during secret sharing).

Note that any communication between producers P and consumers C (or between consumers C and other consumers C) might be performed via direct communication channels and/or through the distributed ledger DL.

Figure 4:
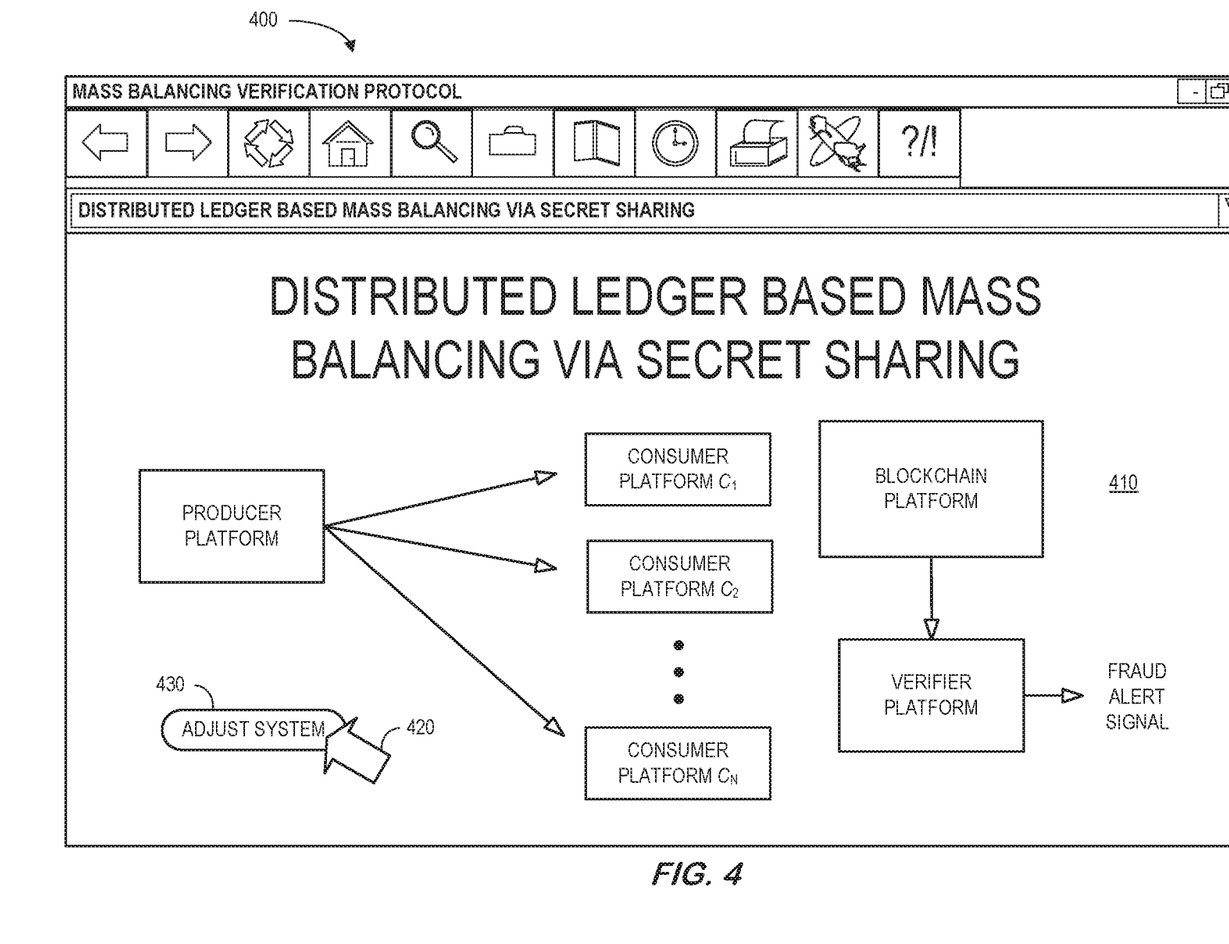
FIG. 4 is a human machine interface display according to some embodiments.

FIG. 4 is a human machine interface display 400 in accordance with some embodiments. The display 400 includes a graphical representation 410 of a blockchain based mass balancing via secret sharing system in accordance with any of the embodiments described herein. Selection of an element on the display 400 (e.g., via a touchscreen or a computer mouse pointer 420) may result in display of a pop-up window containing more detailed information about that element and/or various options (e.g., to add consumers, adjust quota rules or amounts, etc.). Selection of an "Adjust System" icon 430 may also let an operator or administrator alter or fine tune the operation of the system.

Figure 5:
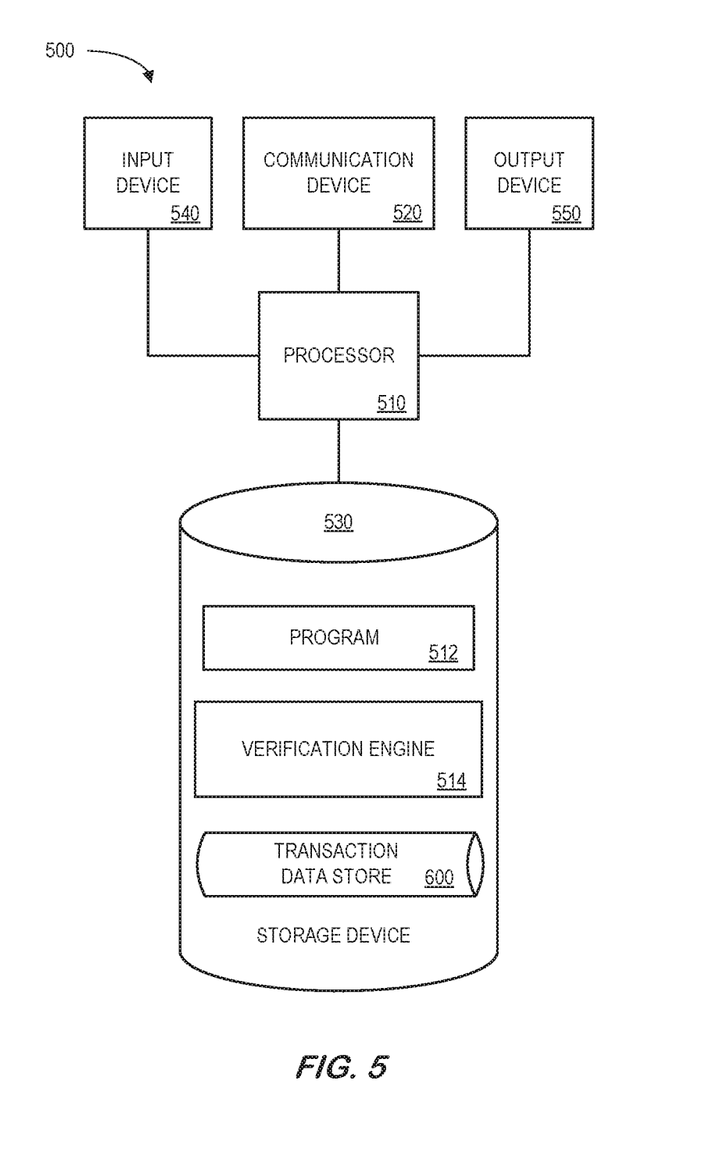
FIG. 5 is an apparatus or platform according to some embodiments.

Note that the embodiments described herein may also be implemented using any number of different hardware configurations. For example, FIG. 5 is a block diagram of an apparatus or platform 500 that may be, for example, associated with the system 200 of FIG. 2 (and/or any other system described herein). The platform 500 comprises a processor 510, such as one or more commercially available Central Processing Units ("CPUs") in the form of one-chip microprocessors, coupled to a communication device 560 configured to communicate via a communication network (not shown in FIG. 5). The communication device 560 may be used to communicate, for example, with one or more remote user platforms, administrator platforms, etc. The platform 500 further includes an input device 540 (e.g., a computer mouse and/or keyboard to enter consumer information, quota amounts, etc.) and/an output device 550 (e.g., a computer monitor to render a display, transmit recommendations, and/or create reports about mass balance verification results etc.). According to some embodiments, a mobile device, monitoring physical system, and/or PC may be used to exchange information with the platform 500.

The processor 510 also communicates with a storage device 530. The storage device 530 may comprise any appropriate information storage device, including combinations of magnetic storage devices (e.g., a hard disk drive), optical storage devices, mobile telephones, and/or semiconductor memory devices. The storage device 530 stores a program 512 and/or a verification engine 514 for controlling the processor 510. The processor 510 performs instructions of the programs 512, 514, and thereby operates in accordance with any of the embodiments described herein. For example, when the platform 500 is associated with a producer the processor 510 may compute K random shares ($r_1$ through $r_K$) of a random value r, publish blinded amounts $t_i$ representing $x_i + r_i$ to a secure, distributed transaction ledger using additive secret sharing to store information associated with amounts $x_i$ in a privacy-preserving form, and transmit an encrypted $r_i$ to consumer $C_i$ using an asymmetric cryptosystem. When the platform 500 is associated with a consumer, the processor 510 may receive the encrypted $r_i$ from the producer platform (while the consumer $C_i$ actually receives an amount $\hat{x}_i$ of the good from the producer), execute a decryption algorithm to determine $r_i$, and compute $\hat{x}_i + r_i$ and generate a fraud alert signal if differs from the published $t_i$. The processor 510 may also transmit an encrypted rolling sum value to a next consumer $C_{i+1}$. When the platform 500 is associated with a verifier, the processor 510 may execute a mass balance verification protocol to determine a total amount of good that the producer had collectively supplied to the consumers $C_i$. The processor 510 may also generate a fraud alert signal when appropriate based on the total amount and a maximum allowed amount (e.g., a production quota).

The programs 512, 514 may be stored in a compressed, uncompiled and/or encrypted format. The programs 512, 514 may furthermore include other program elements, such as an operating system, clipboard application, a database management system, and/or device drivers used by the processor 510 to interface with peripheral devices.

As used herein, information may be "received" by or "transmitted" to, for example: (i) the platform 500 from another device; or (ii) a software application or module within the platform 500 from another software application, module, or any other source.

In some embodiments (such as the one shown in FIG. 5), the storage device 530 further stores a transaction data store 600. An example of a database that may be used in connection with the platform 500 will now be described in detail with respect to FIG. 6. Note that the database described herein is only one example, and additional and/or different information may be stored therein. Moreover, various databases might be split or combined in accordance with any of the embodiments described herein.

Figure 6:
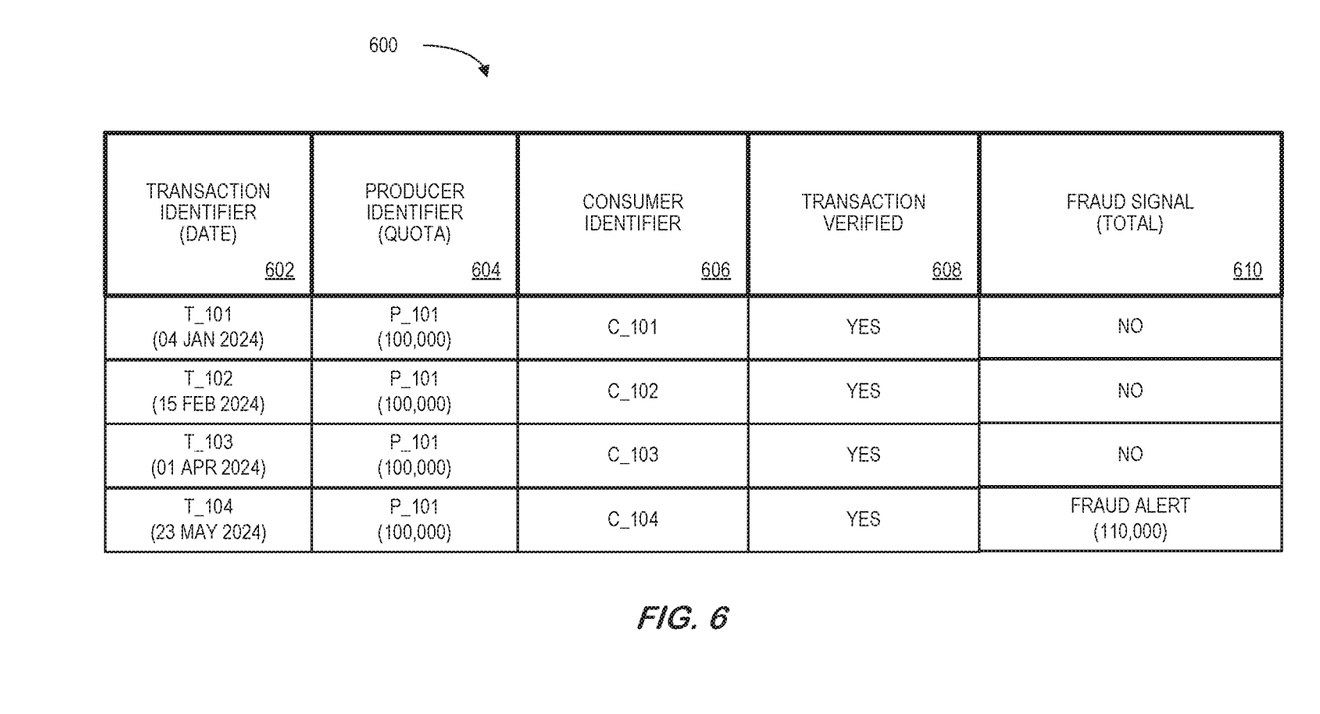
FIG. 6 is portion of a transaction data store in accordance with some embodiments.

Referring to FIG. 6, a table is shown that represents the transaction data store 600 that may be stored at the platform 500 according to some embodiments. The table may include, for example, entries associated with transactions between a producer and consumers. The table may also define fields 602, 604, 606, 608, 610 for each of the entries. The fields 602, 604, 606, 608, 610 may, according to some embodiments, specify: a transaction identifier and date 602, a producer identifier and quota 604, a consumer identifier 606, a transaction verified indication 608, and fraud signal with a total amount 610. The transaction store 600 may be created and updated, for example, when a distributed ledger is updated with information about a new supply of an amount of good from a producer to a consumer, a change in quota, etc.

The transaction identifier and date 602 might be a unique alphanumeric label that is associated with a transaction between a producer and a consumer along with a date that the transaction was executed. The producer identifier and quota 604 might identify who supplied the good to the consumer (along with any mass balance limits associated with that type of good). The consumer identifier 606 might identify who received the good and the transaction verified indication 608 might indicate whether or not that party has verified that the producer reported the correct amount (as compared to the physical amount that was received). The fraud signal 610 might indicate that the system has detected that the producer has exceeded the associated quote (along with the actual total amount of good that was provided by the producer to all of the consumers in aggregate without revealing exactly how much each consumer received individually).

Thus, embodiments may let the data required for mass balancing be kept confidential. Instead, the information is made available in a privacy preserving way. This enables novel business scenarios for distributed ledgers, such as blockchains, where confidentiality can play a substantial role. Furthermore, by using additive secret sharing, embodiments may not only help ensure confidentiality but may also reduce computational complexity (encouraging good scalability). Furthermore, embodiments may enable a variety of use cases based on latest technologies (e.g., distributed ledgers and/or blockchain as well as secret sharing) to improve analytics and intelligent processes in enterprise applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of producers, consumers, and goods, any of the embodiments described herein could be applied to other types of applications. For example, a protocol might help ensure that a single consumer does not exceed an overall quota limiting how much of a particular type of good they are allowed purchase from various producers (without revealing how much each producer individually sold to that consumer).

Figure 7:
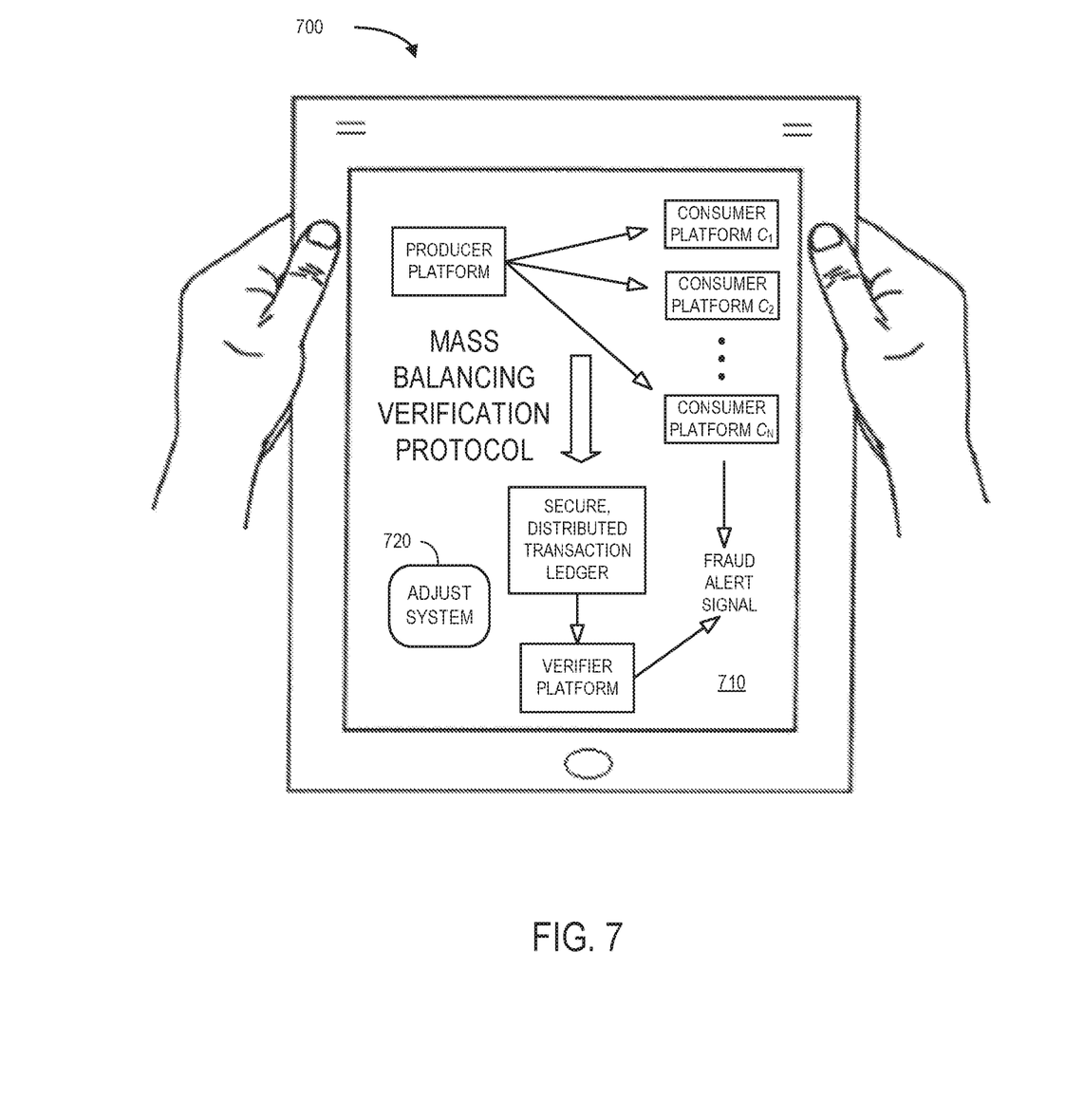
FIG. 7 is a tablet computer according to some embodiments.

Moreover, the displays shown herein are provided only as examples, and any other type of user interface could be implemented. For example, FIG. 7 illustrates a tablet computer 700 with a mass balancing protocol display 710. The display 710 might be used, for example, by an operator or administrator to configure consumer parameters, producer variables (e.g., quotas, blockchain information, etc.). Selection of an adjust system icon 720 might, for example, let an operator add a new consumer platform to the system (along with details about a consumer communication channel, cryptography keys, purchase order and payment identifiers, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a producer who supplies amounts $x_i$ of a good to a plurality of consumers $C_i$ in a series of transactions and is subject to a mass balancing verification protocol after every K transactions, comprising:
   a secure, distributed transaction ledger that stores information associated with amounts $x_i$ in a privacy-preserving form;
   a producer platform, including:
      a computer processor, and
      computer memory, coupled to the computer processor, storing instructions that, when executed by the computer processor cause the processor to:
         (i) compute K random shares ($r_1$ through $r_K$) of a random value r,
         (ii) publish blinded amounts $t_i$ representing $x_i+r_i$ to the secure, distributed transaction ledger using additive secret sharing, and
         (iii) transmit an encrypted $r_i$ to consumer $C_i$ using an asymmetric cryptosystem;
   a consumer platform for each consumer $C_i$, to:
      (i) receive the encrypted $r_i$ from the producer platform while the consumer $C_i$ actually receives an amount $\hat{x}_i$ of the good from the producer,
      (ii) execute a decryption algorithm to determine $r_i$,
      (iii) automatically compute $\hat{x}_i+r_i$ and transmit a fraud alert signal if it differs from the published $t_i$, and
      (iv) transmit an encrypted rolling sum value to a next consumer $C_{i+1}$; and
   a verifier platform to, after K transactions, execute the mass balance verification protocol and automatically determine a total amount of good that the producer had collectively supplied to the consumers $C_i$, and further to transmit a fraud alert signal based on the total amount and a maximum allowed amount.

2. The system of claim 1, wherein the good supplied by the producer is associated with at least one of: (i) a product, (ii) a service, and (iii) a natural resource.

3. The system of claim 1, wherein the verifier platform is associated with at least one of: (i) a governmental authority, and (ii) a non-governmental organization.

4. The system of claim 1, wherein the secure, distributed transaction ledger is associated with blockchain technology.

5. The system of claim 1, wherein the asymmetric cryptosystem is associated with three polynomial time algorithms: (i) a probabilistic key-generation algorithm, (ii) an encryption algorithm, (iii) a probabilistic encryption algorithm, and (iv) a decryption algorithm.

6. The system of claim 5, wherein the asymmetric cryptosystem uses individual key pairs consisting of a public encryption key $pk_i$ and a secret decryption key $sk_i$.

7. The system of claim 1, wherein the mass balancing verification protocol supports multiple producers.

8. The system of claim 1, wherein a balance is cached after every K-cycle to achieve a number of additions that is independent of a number of previous K-cycles.

9. The system of claim 1, wherein communications between producers and consumers are performed via at least one of: (i) a direct communication channel, and (ii) the secure, distributed transaction ledger.

10. The system of claim 1, wherein communications between consumers are performed via at least one of: (i) a direct communication channel, and (ii) the secure, distributed transaction ledger.

11. A computer-implemented method associated with a producer who supplies amounts $x_i$ of a good to a plurality of consumers $C_i$ in a series of transactions and is subject to a mass balancing verification protocol after every K transactions, comprising:
  computing, by a computer processor of a producer platform, K random shares ($r_1$ through $r_K$) of a random value r;
  publishing, by the producer platform, blinded amounts $t_i$ representing $x_i+r_i$ to a secure, distributed transaction ledger using additive secret sharing to store information associated with amounts $x_i$ in a privacy-preserving form;
  transmitting, by the producer platform, an encrypted $r_i$ to consumer $C_i$ using an asymmetric cryptosystem;
  receiving, at a consumer platform of consumer $C_i$, the encrypted $r_i$ from the producer platform while the consumer $C_i$ actually receives an amount $\hat{x}_i$ of the good from the producer;
  executing, by the consumer platform, a decryption algorithm to determine $r_i$;
  automatically computing $\hat{x}_i+r_i$ and transmitting, by the consumer platform, a fraud alert signal if differs from the published $t_i$;
  transmitting an encrypted rolling sum value to a next consumer $C_{i+1}$;
  executing, by a verifier platform after K transactions, the mass balance verification protocol and automatically determine a total amount of good that the producer had collectively supplied to the consumers $C_i$; and
  transmitting, by the verifier platform, a fraud alert signal based on the total amount and a maximum allowed amount.

12. The method of claim 11, wherein the good supplied by the producer is associated with at least one of: (i) a product, (ii) a service, and (iii) a natural resource.

13. The method of claim 11, wherein the verifier platform is associated with at least one of: (i) a governmental authority, and (ii) a non-governmental organization.

14. The method of claim 11, wherein the secure, distributed transaction ledger is associated with blockchain technology.

15. The method of claim 11, wherein the asymmetric cryptosystem is associated with three polynomial time algorithms: (i) a probabilistic key-generation algorithm, (ii) an encryption algorithm, (iii) a probabilistic encryption algorithm, and (iv) a decryption algorithm.

16. The method of claim 15, wherein the asymmetric cryptosystem uses individual key pairs consisting of a public encryption key $pk_i$ and a secret decryption key $sk_i$.

17. The method of claim 11, wherein the mass balancing verification protocol supports multiple producers.

18. A non-transitory, computer-readable medium storing instructions, that, when executed by a processor, cause the processor to perform a method associated with a producer who supplies amounts xi of a good to a plurality of consumers $C_i$ in a series of transactions and is subject to a mass balancing verification protocol after every K transactions, the method comprising:
  computing, by a computer processor of a producer platform, K random shares ($r_1$ through $r_K$) of a random value r;
  publishing, by the producer platform, blinded amounts $t_i$ representing $x_i+r_i$ to a secure, distributed transaction ledger using additive secret sharing to store information associated with amounts $x_i$ in a privacy-preserving form;
  transmitting, by the producer platform, an encrypted $r_i$ to consumer $C_i$ using an asymmetric cryptosystem;
  receiving, at a consumer platform of consumer $C_i$, the encrypted $r_i$ from the producer platform while the consumer $C_i$ actually receives an amount $\hat{x}_i$ of the good from the producer;
  executing, by the consumer platform, a decryption algorithm to determine $r_i$;
  automatically computing $\hat{x}_i+r_i$ and transmitting, by the consumer platform, a fraud alert signal if differs from the published $t_i$;
  transmitting an encrypted rolling sum value to a next consumer $C_{i+1}$;
  executing, by a verifier platform after K transactions, the mass balance verification protocol and automatically determine a total amount of good that the producer had collectively supplied to the consumers $C_i$; and
  transmitting, by the verifier platform, a fraud alert signal based on the total amount and a maximum allowed amount.

19. The medium of claim 18, wherein a balance is cached after every K-cycle to achieve a number of additions that is independent of a number of previous K-cycles.

20. The medium of claim 18, wherein communications between producers and consumers are performed via at least one of: (i) a direct communication channel, and (ii) the secure, distributed transaction ledger.

21. The medium of claim 18, wherein communications between consumers are performed via at least one of: (i) a direct communication channel, and (ii) the secure, distributed transaction ledger.

* * * * *